July 1, 1969 P. J. M. LALLEMANT 3,452,844
SEGMENTED BRAKE DISC

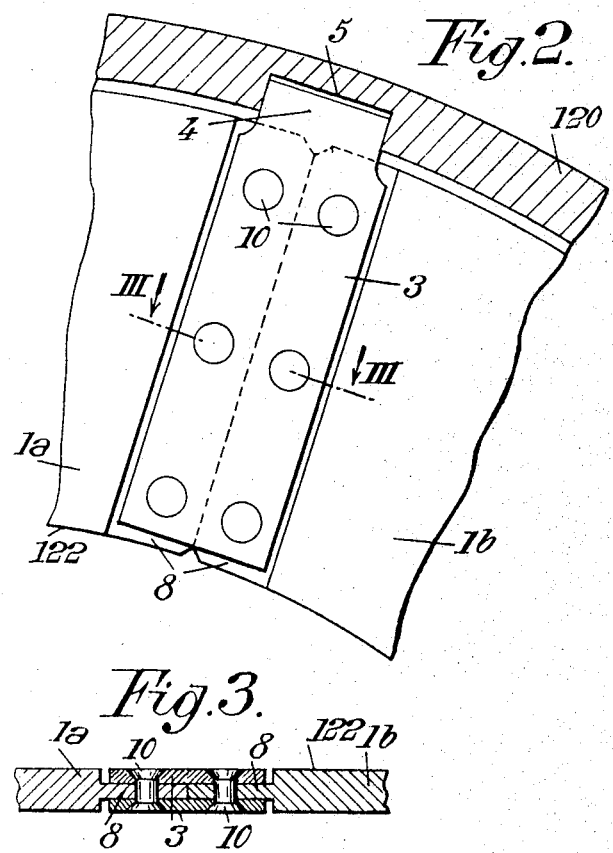

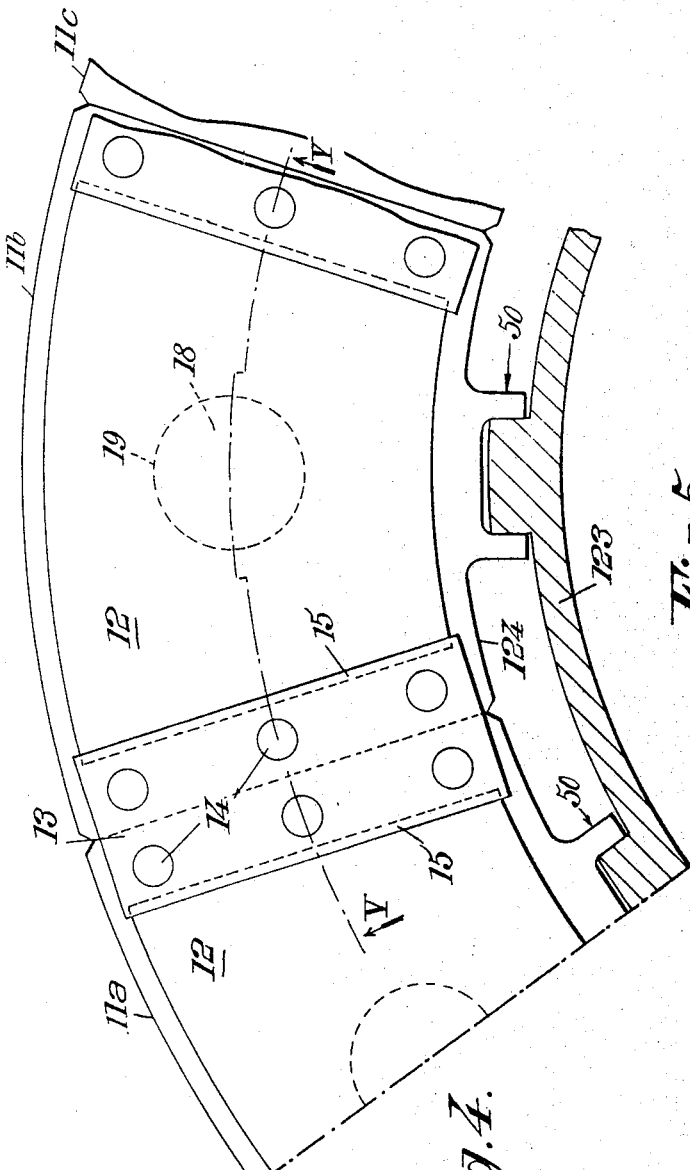
Fig. 4.
Fig. 5.

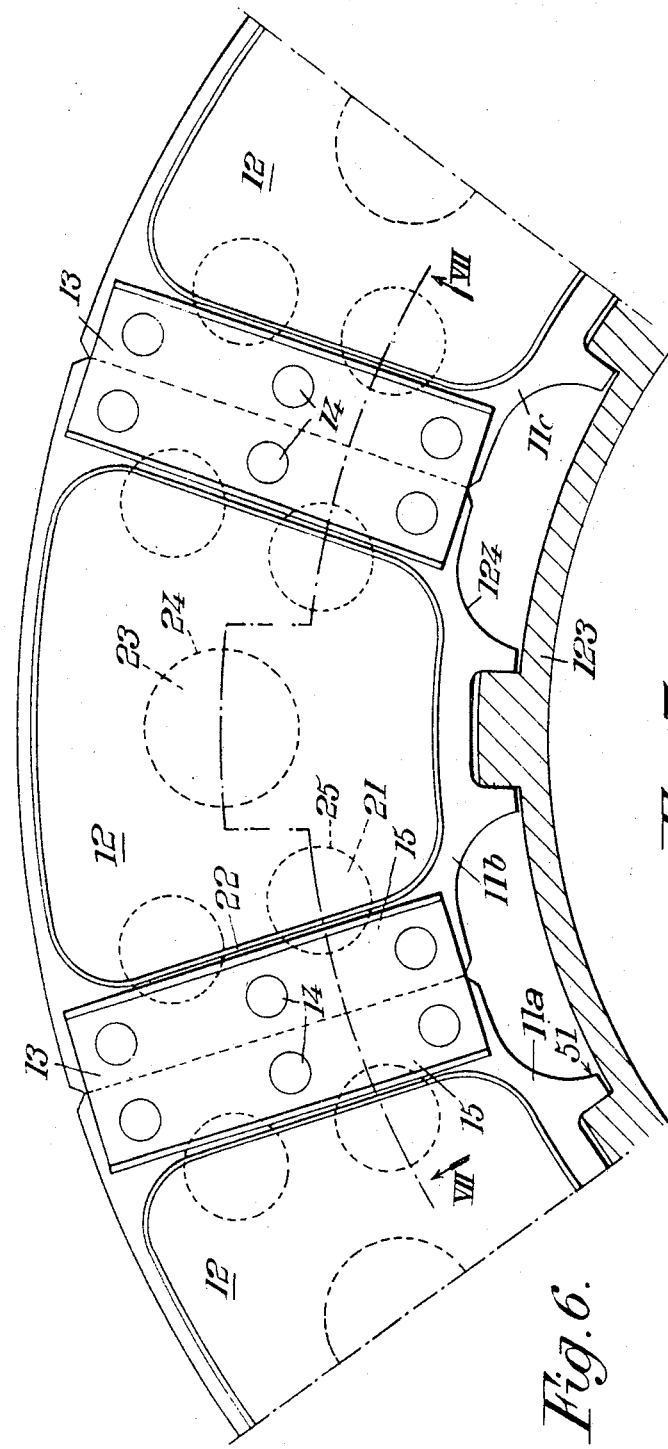

Filed Sept. 28, 1967 Sheet 6 of 6

United States Patent Office 3,452,844
Patented July 1, 1969

3,452,844
SEGMENTED BRAKE DISC
Pierre Joseph Martin Lallemant, Port-Marly, France, assignor to Societe Hispano-Suiza-Lallemant, Bois-Colombes, France
Filed Sept. 28, 1967, Ser. No. 671,362
Claims priority, application France, Oct. 6, 1966, 79,024
Int. Cl. F16d 65/10, 11/00
U.S. Cl. 188—218                    12 Claims

ABSTRACT OF THE DISCLOSURE

A friction disc, which is either rotatable or not, co-operates by friction with another part of the device with which other part the friction disc has a speed of relative rotation. The friction disc comprises distinct sectors interconnected by radial bars fastened to adjacent sectors. The radial bars also serve for connecting the friction disc angularly to a structure which is either rotatable or not, as the case may be, and/or for maintaining lining elements—when these are provided—applied against at least one of the faces of the friction disc.

---

This invention relates, in a general way, to devices comprising at least one friction disc, either turning or not, either with or without added lining elements provided on one and/or the other of its faces, and intended to co-operate by friction (during operation of the device) with at least one other part of the device with which it is put into contact and with respect to which it has a speed of relative rotation.

In such devices, it has already been proposed, with a view to reducing the deformations of the friction disc which are due to the thermal stresses generated during the operation of the device, to form the friction disc in several distinct sectors, each sector being connected to the adjacent sector by assembling means permitting relative tangential displacements between the two sectors being considered.

A device formed in this way then comprises coupling means for rigidly coupling the friction disc angularly with a structure—which is either turning or not—of the device.

A device formed in this way also comprises, when the friction disc is provided with lining elements, retaining means for maintaining these lining elements applied against at least one of the faces of the friction disc.

In the devices known at present, the assembling means, the coupling means and the retaining means are distinct, that is to say that each constituent sector of the friction disc generally comprises, Its own assembling means connecting the sector being considered to the adjacent sector, Its own coupling means rigidly connecting the sector being considered angularly with the structure—which is either turning or not—of the device, and Its own retaining means maintaining one or more lining elements applied against at least one of its faces.

The invention is more particularly, but not exclusively, concerned with disc brakes, in particular those for aviation wheels.

It can thus be seen that the devices of the type already known, that is to say in which the three types of means mentioned above are distinct, have, among other disadvantages, the disadvantages of necessitating costly machining operations for each of the sectors, of requiring a complicated mounting of the friction disc, and of being relatively heavy; this latter disadvantage is particularly significant in the case more especially envisaged, by way of example, in which the invention is applied to disc brakes for aviation wheels.

An object of the principal feature of the invention is to provide devices, in particular disc brakes for aviation wheels, which fulfill the various considerations of practice, in particular concerning their simplicity of manufacture, their facility of mounting and the low value of their weight.

This principal feature of the invention is characterized by the fact that the assembling means interconnecting two adjacent sectors comprise at least one added bar oriented radially and fixed to each of these two adjacent sectors by fastening members mounted with play corresponding to the relative tangential displacements which the two sectors in question should be able to undergo, this added bar comprising a radial extension extending beyond at least one of the two edges (outer or inner edge) of the friction disc to form a tenon adapted to co-operate with a device of complementary form provided in a structure—either turning or not—belonging to the device, and/or at least one stop surface for maintaining one or more lining elements applied against at least one of the faces of the friction disc when this friction disc is provided with these lining elements, the added bars of such a friction disc not projecting out at any point from an active face of the friction disc.

This feature permits of realizing a device which is simple to manufacture, easy to mount and of light weight, due to the double or even triple role played by the added bars.

The invention comprises, apart from this principal feature, certain other features which are preferably used at the same time, and which will become clear from the following specific description.

Preferred embodiments of the invention will now be described, merely by way of example, with reference to the accompanying drawings, in which:

FIGURE 2 shows, by a partial front view, one embodiment of a friction disc, not provided with lining elements, arranged according to the invention;

FIGURE 3 is a section along the line III—III of FIGURE 2;

FIGURE 4 shows, by a partial front view, an embodiment of a friction disc, provided with lining elements, arranged according to the invention;

FIGURE 5 is a section along the line V—V of FIGURE 4;

FIGURE 6 shows, by a partial front view, another embodiment of a friction disc, provided with lining elements, arranged according to the invention;

FIGURE 7 is a section along the line VII—VII of FIGURE 6;

The embodiments described below all relate to disc brakes, in particular disc brakes for aviation wheels.

Figure 1:
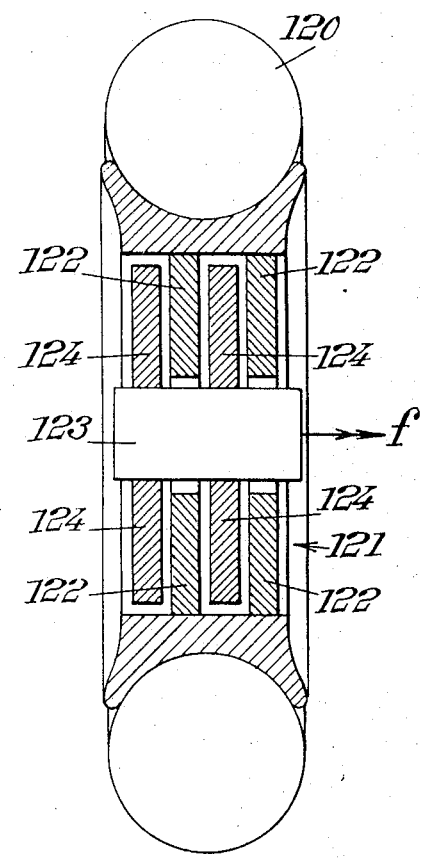
FIGURE 1 illustrates schematically by an axial section an assembly formed by a wheel and a disc brake in which the friction discs conform to the present invention.

As shown in FIGURE 1, this brake 121, in its overall aspect, is formed in any appropriate manner, with the only condition being that it comprises at least one friction disc participating in the rotary movement of a wheel 121 to be braked—for example two turning discs 122 as shown in FIGURE 1—this friction disc being adapted to co-operate, following a relative axial displacement, with at least one non-rotating friction disc—for example two non-turning discs 124 as shown in FIGURE 1— rigid in rotation (or rather in the absence of rotation) with a non-turning structure 123.

The relative axial displacement of the turning disc 122 with respect to the non-turning disc 124 is obtained by displacing all or part of the non-turning structure 123 in the direction of the arrow f.

The friction discs of such a disc brake 123 comprise, as shown in FIGURES 2 to 8 and 10, a plurality of distinct sectors indicated by the reference numerals 1a, 1b, 1c, etc. . . . for a turning disc 122, and indicated by the reference numerals 11a, 11b, 11c, etc. . . . for a non-turning disc 124.

Each sector is connected to the adjacent sector by assembling means permitting relative tangential displacements between the two sectors being considered.

The disc brake 121 thus formed then comprises coupling means for rigidly connecting each turning disc 122 angularly with the wheel 120, and each non-turning disc 124 with the non-turning structure 123 of the disc barke.

The disc brake 121 thus formed also comprises, when certain of the friction discs are provided with lining elements 12, retaining means for maintaining these lining elements 12 applied against at least one of the faces of the friction disc.

In one embodiment of the invention (FIGURES 2 and 3), the assembling means interconnecting two adjacent sectors comprise at least one added bar 3, oriented radially and fixed to each of the two adjacent sectors by fastening members 10 mounted with play corresponding to the relative tangential displacements which the two sectors in question should be able to undergo, the added bar 3 comprising a radial extension 4 extending beyond at least one of the two edges (outer or inner edge) of the friction disc to form a tenon adapted to co-operate with a device 5 of complementary form provided in the wheel 120 or in the non-turning structure 123 of the disc brake 121, the added bars 3 of such a friction disc not projecting out at any point from an active face of the friction disc.

In another type of embodiment of the invention (FIGURES 4, 5, 6 and 7), the assembling means interconnecting two adjacent sectors comprise at least one added bar 13, oriented radially and fixed to each of the two adjacent sectors by fastening members 14 mounted with play corresponding to the relative tangential displacements which the two sectors in question should be able to undergo, the added bar 13 comprising, when the friction disc is provided with lining elements 12, at least one stop surface 15 for maintaining the lining elements 12 applied against at least one of the faces of the friction disc, the added bars 13 of such a friction disc not projecting out at any point from an active face of the friction disc.

In still another type of embodiment of the invention (FIGURES 8, 9, 10 and 11), the assembling means interconnecting two adjacent sectors comprise at least one added bar 313 oriented radially and fixed to each of the two adjacent sectors by fastening members 114 mounted with play corresponding to the relative tangential displacements which the two sectors in question should be able to undergo, the added bar 313 comprising, when the friction disc is provided with lining element 12, on the one hand, a radial extension 27 extending beyond at least one of the two edges (outer or inner edge) of the friction disc to form a tenon adapted to co-operate with a device of complementary form 28 provided in the wheel 120 or in the non-turning structure 123 of the disc brake 121, and on the other hand, at least one stop surface 115 for maintaining the lining elements 12 applied against at least one of the faces of the friction disc, the added bars 313 of such a friction disc not projecting out at any point from an active face of the friction disc.

It can then be seen that a disc brake arranged as has just been described is particularly simple to manufacture, easy to mount, and of light weight, due to the double or triple role played by the added bars 3 or 13 (these added bars playing a double role), or 313 (these added bars playing a triple role).

Referring now in more detail to the embodiment of FIGURES 2 and 3 which relates to a turning disc 122 not provided with lining elements, the added bars 3 comprise radial extensions 4 which, preferably, extend beyond the outer edge of the turning disc 122 to co-operate with the device 5 of complementary form which then comprises a housing formed in the wheel 120.

Each of the two opposed ends of the two adjacent sectors 1a and 1b of a turning disc 122 comprises a median thinned down portion in the form of a tongue 8, the added bar 3 then comprising two parts disposed one on each side of this median tongue 8.

As for the fastening members 10, they comprise drilled rivets with milled heads, distributed for example in two groups of three rivets fastened respectively to the sector 1a and the sector 1b.

Referring now to the embodiment of FIGURES 4 and 5 which relates to a non-turning disc 124, each sector of which is provided with a lining element 12 on each of its two faces, the added bars 13 comprise two parts disposed one on each side of the disc. These added bars 13 comprise the stop surfaces 15 which are, preferably, disposed laterally. Such stop surfaces 15 are directed towards the disc and are recessed in the surface of the added bar 13 bearing on the disc in a manner to co-operate by abutment with a bearing zone 16 provided on the lining element 12.

In these conditions, each lining element 12 comprises,

A metal support 17 of trapezoidal shape and having, in its central part, a stud 18 maintained in a bore 19 provided in the non-turning disc 124, and A layer of sintered material 20 deposited on the metal support 17 while allowing the bearing zone 16, intended to co-operate with the stop surface 15 of the added bar 13 being considered, to remain on each of the converging sides of the metal support 17.

It is then appropriate to mention that the coupling means for angularly connecting this non-turning disc 124 with the non-turning structure 123 of the disc brake can comprise, in a conventional manner, a plurality of teeth and gaps indicated by the reference numeral 50 in FIGURE 4.

Referring to the embodiment illustrated in FIGURES 6 and 7 which relates to a non-turning disc 124 each sector of which is provided with a lining element 12 on each of its two faces, the added bars 13 comprise two parts disposed one on each side of the disc. The added bars 13 comprise the stop surfaces 15 which are, preferably, disposed laterally. Such stop surfaces 15 are directed towards the disc and comprise the lateral edges of the surface of the added bar 13 bearing on the disc in a manner to co-operate by abutment with at least one arm 21 carried by the lining element 12.

Preferably, each lining element 12 carries at least two arms 21 co-operating respectively with the left added bar 13 and the right added bar 13. Thus, each added bar 13 co-operates by abutment with at least one arm 21 carried by each of the two lining elements 12 between which this added bar 13 is disposed.

In these conditions, each lining element 12 advantageously comprises,

A metal saucer 22 of trapezoidal shape having, in its central part, a stud 23 maintained in a bore 24 formed in the non-turning disc 124, and, on each of its two converging sides, two arms 21 which advantageously have the shape of a pill box, each of the four arms 21 carried by this metal saucer 22 engaging in a bore 25 provided in the non-turning disc 124, and A layer of sintered material 26 deposited in this metal saucer 22.

It is appropriate to mention that the coupling means for angularly connecting this non-turning disc 124 with the non-turning structure 123 of the disc brake can comprise, in a conventional manner, a plurality of teeth and gaps indicated by the reference numeral 51 in FIGURE 6.

With regard to these two embodiments illustrated respectively in FIGURES 4 and 5 and FIGURES 6 and 7, it will be noted that the fastening members 14 comprise rivets, for example distributed in two groups of three rivets fastened respectively to the sector 11a and the sector 11b.

Referring to the embodiment illustrated in FIGURES 8 to 11 which relates to a non-turning disc 124 each sector of which is provided with a lining element 12 on each of its two faces, the added bars 313 comprise the radial extension 27 which, preferably, extends beyond the inner edge of the non-turning disc 124, and these bars 313 also comprise stop surfaces 115 which are, preferably, disposed laterally.

Figure 8:
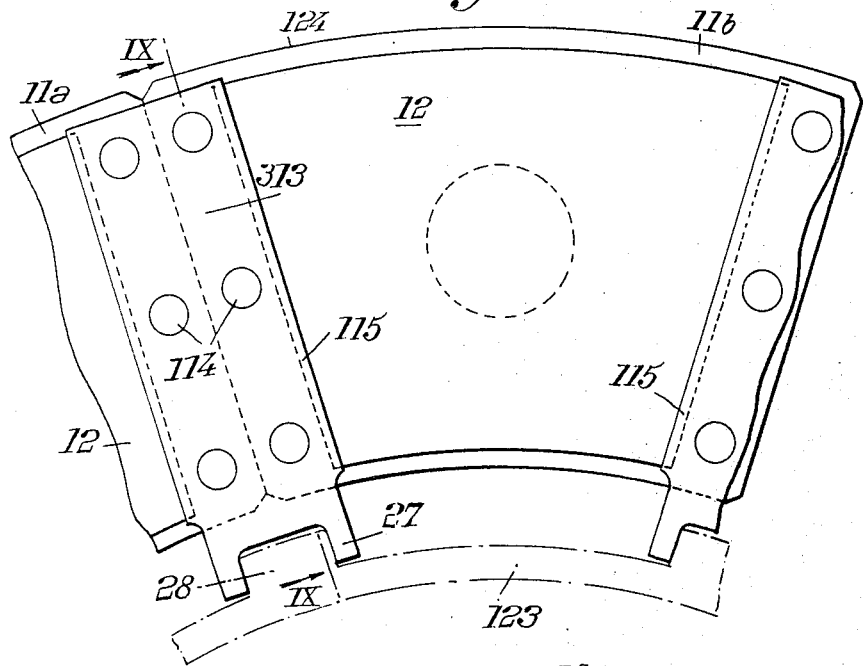
FIGURE 8 shows, in the same conditions as FIGURE 4, a friction disc arranged, conforming to the invention, according to still another embodiment.
Figure 9:
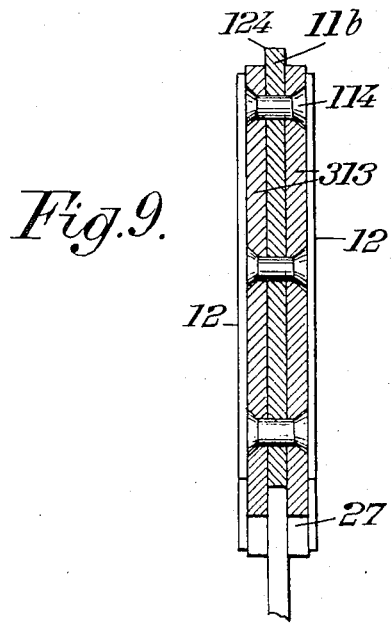
FIGURE 9 is a section along the line IX—IX of FIGURE 8.

According to the arrangement of this embodiment as illustrated in FIGURES 8 and 9—in which the same reference numerals designate the same pieces as in FIGURES 4 and 5—the radial extension 27 forms a tenon of the female type co-operating with the device of complementary form 28 which then comprises a tooth provided on the non-turning structure 123.

Figure 10:
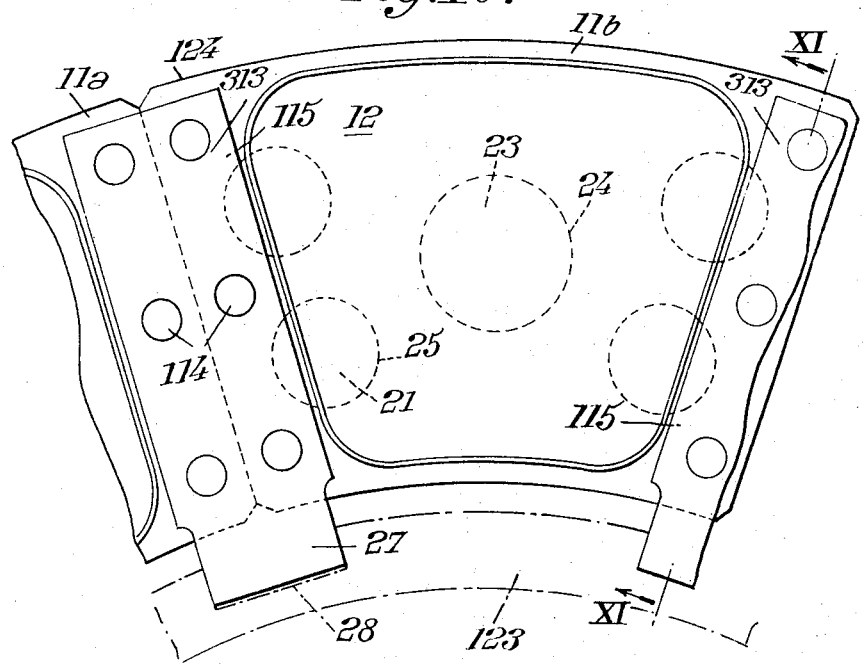
FIGURE 10 shows, in the same conditions as FIGURE 6, a friction disc arranged according to a modification of the embodiment already shown in FIGURE 8.
Figure 11:
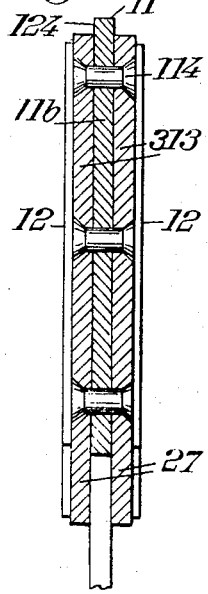
FIGURE 11 is a section along the line XI—XI of FIGURE 10.

According to the arrangement of this embodiment as illustrated in FIGURES 10 and 11—in which the same reference numerals designate the same pieces as in FIGURES 6 and 7—the extension 27 forms a tenon of the male type co-operating with the device of complementary form 28 which then comprises a groove provided in the non-turning structure 123.

With the respect to the embodiment illustrated in FIGURES 8, 9, 10 and 11, it will be noted that the fastening members 114 comprise rivets, for example distributed in two groups of three rivets fastened respectively to the sector 11a and the sector 11b.

Whatever embodiment is adopted, a disc brake constructed according to the invention has numerous advantages particularly with respect to its simplicity of manufacture, its facility of mounting and the low value of its weight.

These advantages result,

In the case of a friction disc not provided with lining elements, from the double role played by the added bars, namely the role of assembling means and role of coupling means, In the case of a friction disc equipped with lining elements provided on one and/or the other of its faces, from the double role played by the added bars, namely the role of assembling means and the role of retaining means, In the case of a friction disc equipped with lining elements provided on one and/or the other of its faces, from the triple role played by the added bars, namely the role of assembling means, the role of coupling means and the role of retaining means.

Although the invention has been specifically described with respect to particular embodiments, it should be understood that the invention is not limited thereto, as here might be numerous changes made without departing from the spirit and scope of the present invention.

What I claim is:

1. Friction disc device comprising
   at least one friction disc having respectively on opposite sides thereof two active faces adapted to come into contact and co-operate by friction with at least one other part of the device with which other part said friction disc has a speed of relative rotation,
   a said friction disc having an outer and an inner edge and comprising a plurality of distinct sectors,
   at least one pair of radially oriented added bars, each bar extending radially along a substantial extent between said inner edge and said outer edge and said outer edge and being fastened with play to the same two adjacent sectors to interconnect said two adjacent sectors while allowing relative tangential displacements between said two adjacent sectors.
   the respective two adjacent edges of said two adjacent sectors of the friction disc each comprising a median tongue which is thinner than the axial thickness between said two active faces of the disc, the two added bars of said pair being disposed respectively on opposite sides of said median tongue without projecting out at any point from the corresponding active faces of said friction disc,
   and at least one of said added bars of said pair comprising a radial extension extending beyond one of said two edges of said friction disc to form a tenon engaging with a correspondingly shaped portion of a structure belonging to the device for angularly connecting said friction disc to said structure to prevent relative rotation between said friction disc and said structure.

2. Friction disc device according to claim 1, in the form of a disc brake, in which said friction disc is adapted to rotate, said radial extension comprised by at least one of said added bars extending beyond the outer edge of the friction disc for engaging with a housing formed in a rotating structure of the device.

3. Friction disc device according to claim 1 in which each sector is provided on each side thereof with a lining element, the lining elements of one side, as a whole, forming one of said active faces of said friction disc, and the lining elements of the other side, as a whole, forming the other active face of said friction disc, each said added bar comprising at least one stop surface disposed laterally on said added bar for engaging and maintaining one of said lining elements applied against the corresponding side of the corresponding sector of the friction disc.

4. Friction disc device according to claim 3, in the form of a disc brake, in which said friction disc is non-rotatable, said radial extension extending beyond the inner edge of the friction disc.

5. Friction disc device according to claim 4, in which said radial extension comprises a tenon of the female type engaging with a correspondingly shaped portion in the form of a tooth provided on a non-turning structure of the device.

6. Friction disc device according to claim 4, in which the radial extension comprises a tenon of the male type engaging with a correspondingly shaped portion in the form of a groove provided in a non-turning structure of the device.

7. Friction disc device comprising
   at least one friction disc having respectively on opposite sides thereof two active faces adapted to come into contact and co-operate by friction with at least one other part of the device with which other part said friction disc has a speed of relative rotation,
   said friction disc having an outer and an inner edge and comprising a plurality of distinct sectors, each sector being provided on each side thereof with a lining element, the lining elements of one side, as a whole, forming one of said active faces of said friction disc, and the lining elements of the other side, as a whole, forming the other active face of said friction disc,
   at least one pair of radially oriented added bars, each bar extending radially along a substantial extent between said inner edge and said outer edge and being fastened with play to two adjacent sectors to interconnect said two adjacent sectors while allowing relative tangential displacements between said two adjacent sectors,
   the respective two adjacent edges of said two adjacent sectors of the friction disc each comprising a median tongue which is thinner than the axial thickness between said two active faces of the disc, the two added bars of said pair being disposed respectively on opposite sides of said median tongue without projecting out at any point from the corresponding active faces of said friction disc, each said added bar comprising at least one stop surface disposed laterally on said added bar for engaging and maintaining one of said lining elements applied against the corresponding side of the corresponding sector of the friction disc.

8. Friction disc device according to claim 7, in the form of a disc brake, in which said friction disc is non-rotatable, and in which said stop surfaces are directed towards the friction disc and are recessed in the surface of the added bar, each said stop surface abutting on a bearing zone provided on the lining element for maintaining said lining element applied against the corresponding side of the corresponding sector of the friction disc.

9. Friction disc device according to claim 8, in which each lining element comprises, a metal support of trapezoïdal shape bearing, in its central part, a stud maintained in a bore provided in the friction disc, and a layer of sintered material deposited on the metal support while leaving on each of the converging sides of said trapezoïdal metal support the bearing zone adapted to co-operate with the stop surface of the added bar.

10. Friction disc device according to claim 7, in the form of a disc brake, in which said friction disc is non-rotatable, and in which said stop surfaces are directed towards the friction disc and comprise the lateral edges of the surface of the added bar, each said stop surface abutting on at least one arm carried by the lining element for maintaining said lining element applied against the corresponding side of the corresponding sector of the friction disc.

11. Friction disc device according to claim 10, in which each lining element bears at least two arms co-operating respectively with the two added bars on the two radial edges of the corresponding side of the corresponding sector.

12. Friction disc device according to claim 10, in which each lining element comprises a metal saucer of trapezoïdal shape having, in its central part, a stud maintained in a bore provided in the friction disc, said metal saucer having, on each of its two converging sides, two arms in the form of pill boxes, each of the four arms carried by this metal saucer engaging in a bore provided in the friction disc, and a layer of sintered material deposited in this metal saucer.

References Cited

UNITED STATES PATENTS

| | | |
|---|---|---|
| 1,757,273 | 5/1930 | Thompson. |
| 2,561,445 | 7/1951 | McCune. |
| 2,767,817 | 10/1956 | Davis. |
| 2,902,130 | 9/1959 | Halberg et al. |
| 2,916,123 | 12/1959 | Garmager _____ 192—107 |
| 2,986,252 | 5/1961 | Du Bois _____ 188—218 X |
| 3,376,960 | 4/1968 | Bender _____ 188—218 |
| 2,989,149 | 6/1961 | Klaue _____ 188—218 |

FOREIGN PATENTS

| | | |
|---|---|---|
| 690,145 | 4/1953 | Great Britain. |
| 35,500 | 2/1954 | Poland. |

GEORGE E. A. HALVOSA, Primary Examiner.

U.S. Cl. X.R.

192—107